United States Patent [19]

Evans, Jr. et al.

[11] Patent Number: 4,933,864
[45] Date of Patent: Jun. 12, 1990

[54] MOBILE ROBOT NAVIGATION EMPLOYING CEILING LIGHT FIXTURES

[75] Inventors: John M. Evans, Jr., Brookfield; Carl F. R. Weiman, Westport; Steven J. King, Woodbury, all of

[73] Assignee: Transitions Research Corporation, Danbury, Conn.

[21] Appl. No.: 253,231

[22] Filed: Oct. 4, 1988

[51] Int. Cl.⁵ .................... G06E 15/50; G01C 21/00; G06F 15/64

[52] U.S. Cl. .................... 364/449; 364/436; 364/450; 364/460; 364/424.01; 364/559; 180/167; 318/587

[58] Field of Search .................. 364/424.02, 436, 449; 318/587; 180/167-169

[56] References Cited

U.S. PATENT DOCUMENTS

| | | | |
|---|---|---|---|
| 4,779,095 | 10/1988 | Guerreri | 180/169 |
| 4,790,402 | 12/1988 | Field et al. | 364/424.02 |
| 4,819,169 | 4/1989 | Saitoh et al. | 364/424.02 |

FOREIGN PATENT DOCUMENTS 0221910  10/1986  Japan .................... 318/587

Primary Examiner—Parshotam S. Lall
Assistant Examiner—Michael Zanelli
Attorney, Agent, or Firm—Perman & Green

[57] ABSTRACT

Apparatus and method which provides for the determination of a vehicle's orientation and position in an environment, such as a hallway, from an image of ceiling lights. A mobile robot 10 includes a camera 12 that is pitched up obliquely at an intermediate angle between a horizon and a zenith. The camera views a ceiling having one or more ceiling lights 16 which may be of rectangular shape and which are preferably aligned with an axis of the hallway. In that the lights present a pattern or alignment which is substantially parallel to or perpendicular to a long axis of the hallway the pattern is detected and processed to derive robot navigation information therefrom.

24 Claims, 8 Drawing Sheets

FIG.1c
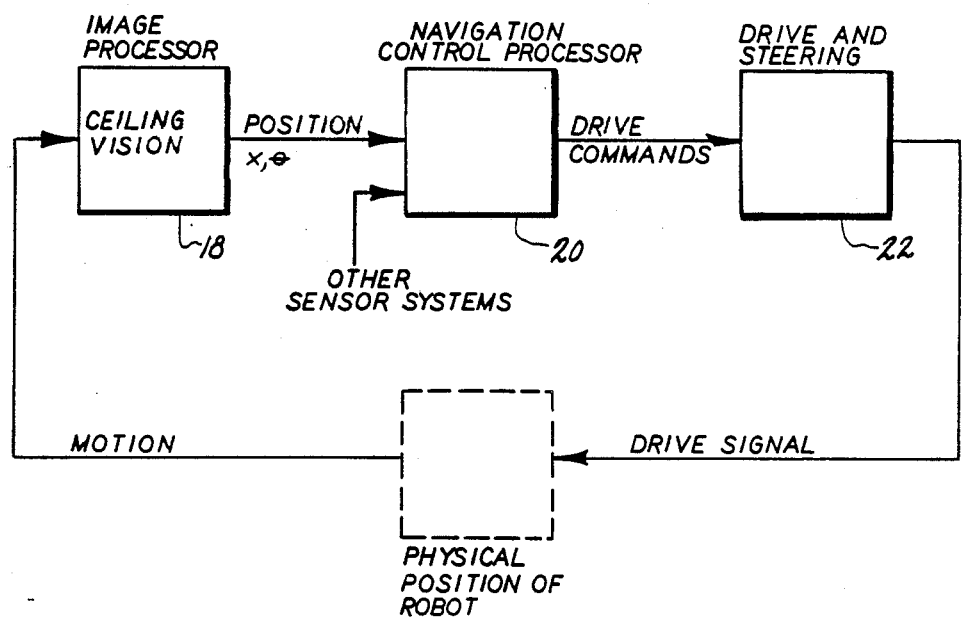
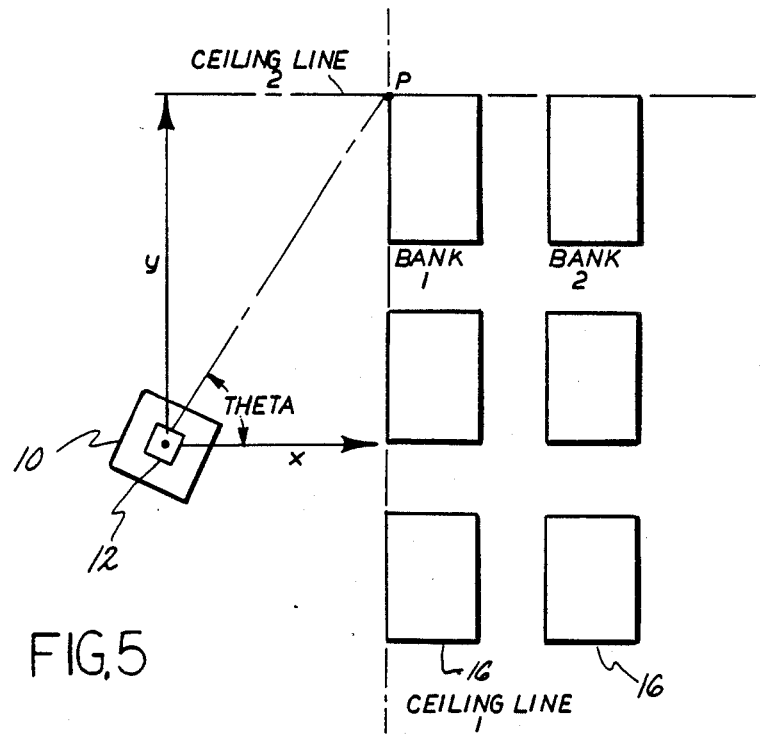
FIG.5

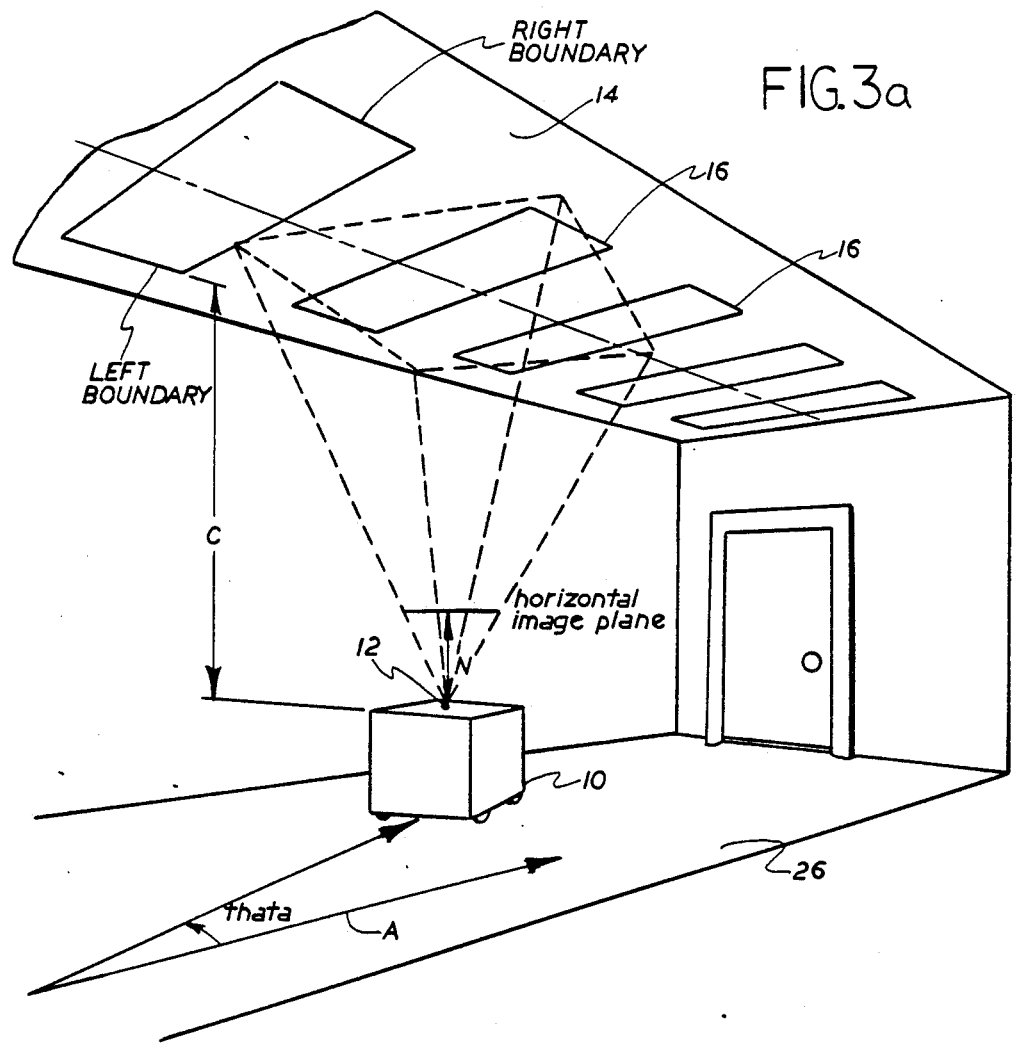
FIG.3a
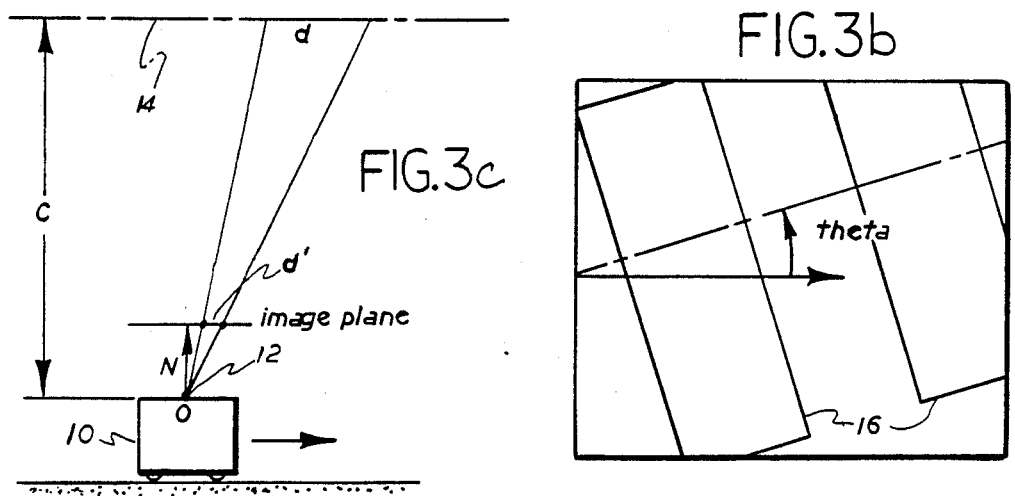
FIG.3c
FIG.3b

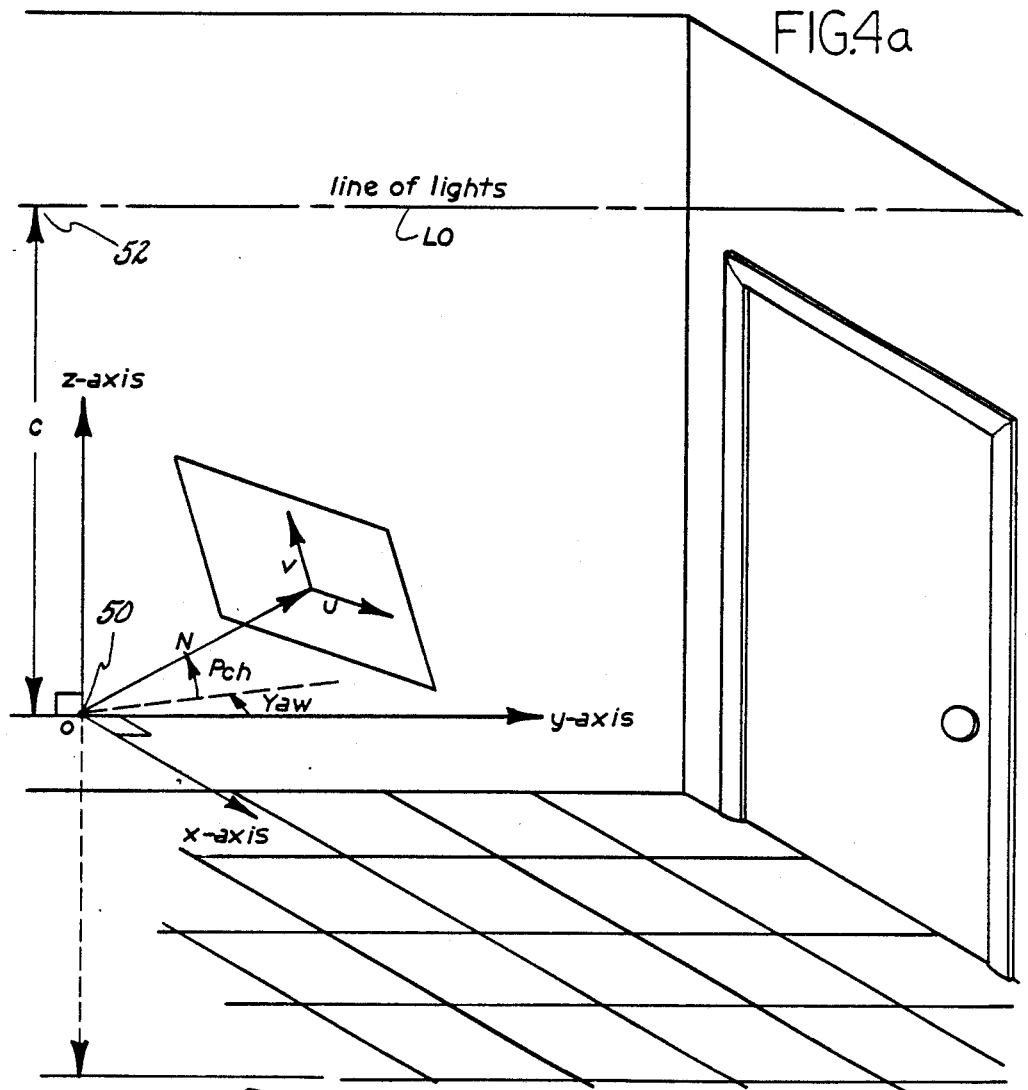
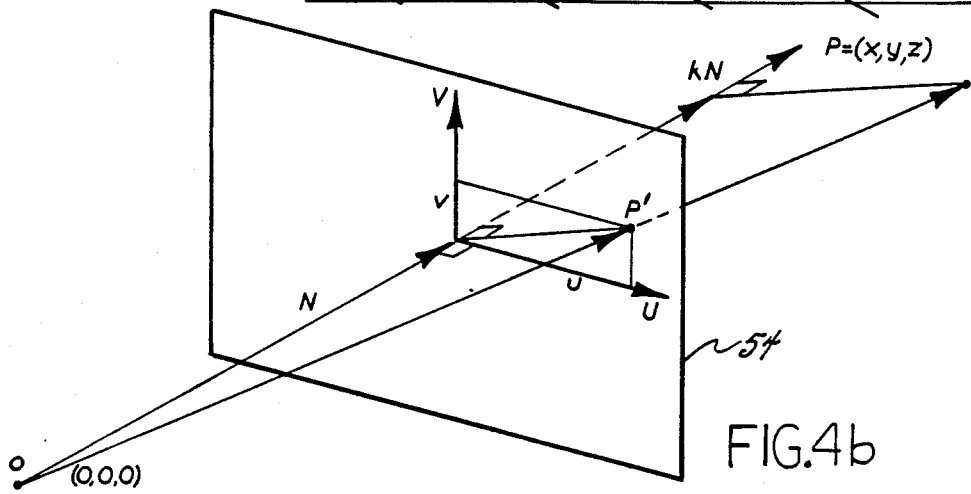
FIG.4a
FIG.4b

FIG.4d
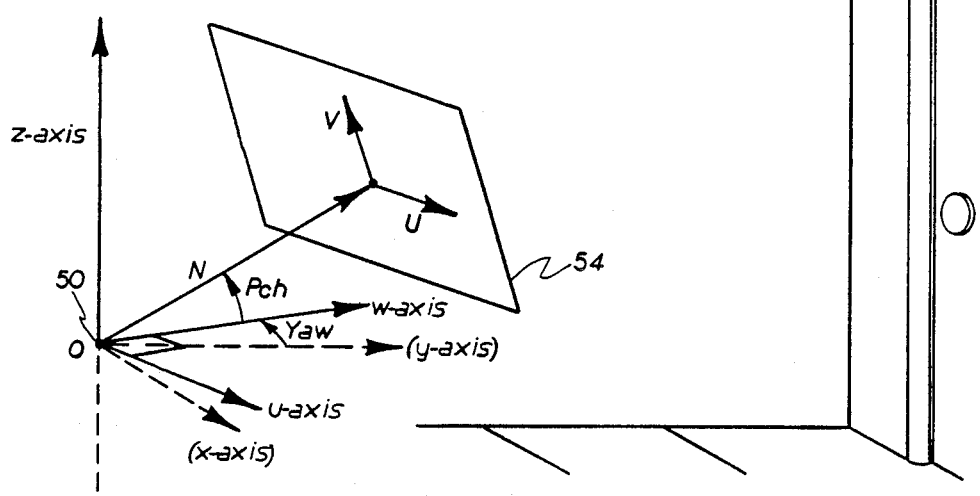
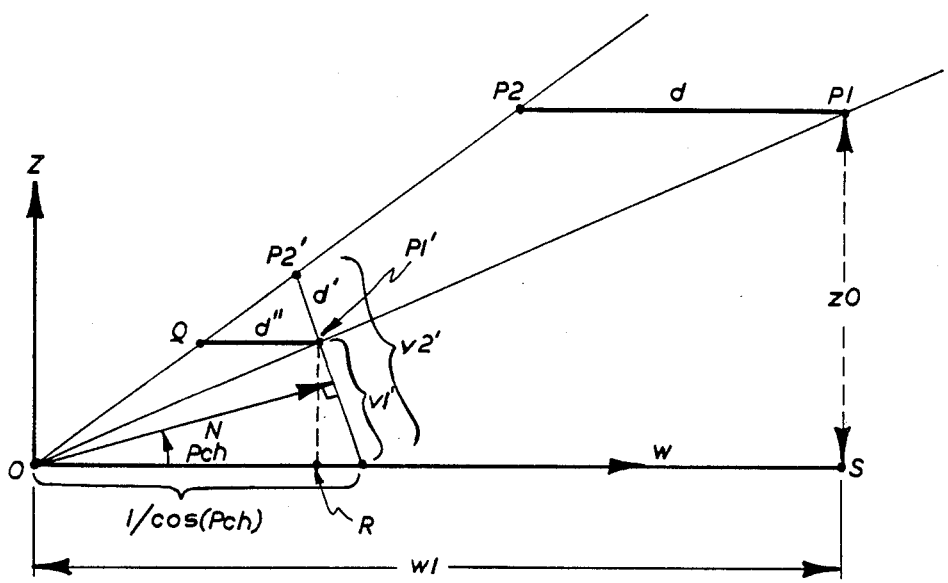
FIG.4e

MOBILE ROBOT NAVIGATION EMPLOYING CEILING LIGHT FIXTURES

FIELD OF THE INVENTION

This invention relates generally to navigation of a moving vehicle such as a mobile robot and, in particular, to a vision system which includes a camera carried by the vehicle which views ceiling lights and which infers navigation data from the alignment thereof.

BACKGROUND OF THE INVENTION

A moving autonomous vehicle, such as a mobile robot, typically includes some type of sensor system for sensing an environment through which the vehicle navigates. Systems employing ultrasonic detectors, mechanical contact devices and laser ranging apparatus are known in the art. Other systems which include a camera to observe the environment and a passive three dimensional image processing system are also known.

A problem associated with traditional three dimensional passive scene analysis vision systems is that such systems require large amounts of computing power. Such systems are also relatively slow and often yield erroneous results. Typically the interpretation of data is too slow to be useful for real time navigation, and may prove erroneous, such as interpreting a shadow as an object, which results in navigation errors. In that the vision system is preferably carried by the robot and is powered by the robot's battery, the size and power consumption of the image processing system are important considerations.

Another problem associated with conventional image analysis systems is related to the often visually "rich" images which the system is required to analyze. For example, in a typical hospital environment a hallway may contain a number of stationary objects, such as laundry carts, meal carts and medical equipment, in addition to a number of moving objects such as employees and patients. In order to navigate rapidly and accurately through such an environment sophisticated and time consuming image analysis techniques are required.

It has also been known to provide special visual markers or "beacons" with are not native to the robot's environment. Such beacons are undesirable in that they introduce additional cost and complexity to the system and require a modification of the robot's environment. Furthermore, it is essential that the beacons not be obscured by objects which may be placed within the environment.

Commercial applications of mobile robots in the service sector include floor cleaning, aids to the handicapped, hospital delivery systems, mail carts, and security. These applications require robust, reliable navigation using sensors which are low in cost and power consumption while providing real-time maneuvering data.

It is therefore one object of the invention to provide a simplification of vision and vision processing for a vehicle, such as a mobile robot.

It is another object of the invention to provide a vision system for a mobile robot, the system requiring a minimum of image processing complexity while yet having an image resolution which is sufficient for guiding the robot through an environment.

It is a further object of the invention to provide a vision system for a mobile robot which does not require beacons or other environmental modification means to be disposed within the robot's environment.

It is another object of the invention to provide a vision system for a mobile robot which operates in a high speed manner and which permits the continuous, adaptive motion of the robot through the robot's environment.

It is one further object of the invention to provide a vision system for a mobile robot which analyses a portion of the robot's environment which is relatively visually simple and which is generally free of stationary or moving objects and which further includes a plurality of native, visually distinct reference objects.

It is one still further object of the invention to provide a vision system for a mobile robot which views an image of a ceiling disposed above and/or in front of the robot, the vision system inferring navigation related data from the orientation of ceiling lights.

SUMMARY OF THE INVENTION

The foregoing and other problems are overcome and the objects are realized by, in accordance with the invention, apparatus and method which provide for the determination of vehicle orientation and lateral position in an environment, such as a hallway, from an image of ceiling lights. The invention provides for a mobile robot having a zenith gazing camera or a camera that is pitched up obliquely at an intermediate angle between a horizon and the zenith. The ceiling lights may be of rectangular shape and are preferably aligned with an axis of the hallway. The ceiling lights may be arranged with an axis parallel to or perpendicular to a long axis of the hallway. The lights may comprise incandescent or fluorescent bulbs and may or may not be covered. In that the lights present a pattern of alignment which is substantially parallel to or perpendicular to the long axis of the hallway the invention advantageously exploits this pattern to derive robot navigation information therefrom.

In accordance with the invention there is disclosed navigation apparatus for generating navigation related information for a vehicle, such as a mobile robot. The apparatus includes means for obtaining an image of a surface which overlies a vehicle or a projected path of the vehicle, the surface having one or more sources of illumination disposed thereon; means, coupled to the obtaining means, for detecting within the image a location of the one of more sources and means, coupled to the detecting means, for generating, from the detected source location or locations, vehicle navigation information. The generating means is shown to include means for determining at least an offset distance and an angular displacement of the vehicle relative to the location of the source within the image.

Further in accordance with the invention there is disclosed a method of providing navigation related information for a mobile robot. The method includes the steps of (a) obtaining at least one image of a ceiling having one or more distinct visual features, the ceiling overlying at least the projected path of the robot; (b) locating within the ceiling image the one or more distinct visual features; (c) detecting a boundary of the distinct visual features; (d) generating at least one reference line relative to the detected boundary; and (e) determining a location of the robot relative the reference line.

BRIEF DESCRIPTION OF THE DRAWINGS

The foregoing aspects of the invention will be made more apparent in the ensuing Detailed Description of the Invention read in conjunction with the accompanying Drawing wherein:

FIG. 1b is a block diagram of the image processor 18 of FIG. 1a;

FIG. 1c is a block diagram which illustrates a feedback control system wherein ceiling related position measurements function as an error signal;

FIGS. 3a, 3b and 3c are illustrative views of a robot within an environment having a plurality of ceiling fixtures;

FIGS. 4a, 4b, 4c, 4d, 4e and 4f are graphical representations of the mathematical derivation of robot position relative to ceiling light fixtures;

FIG. 5 is a top view of a robot positioned within an environment having a plurality of rows or banks of ceiling lights

DETAILED DESCRIPTION OF THE INVENTION

Figure 1A:
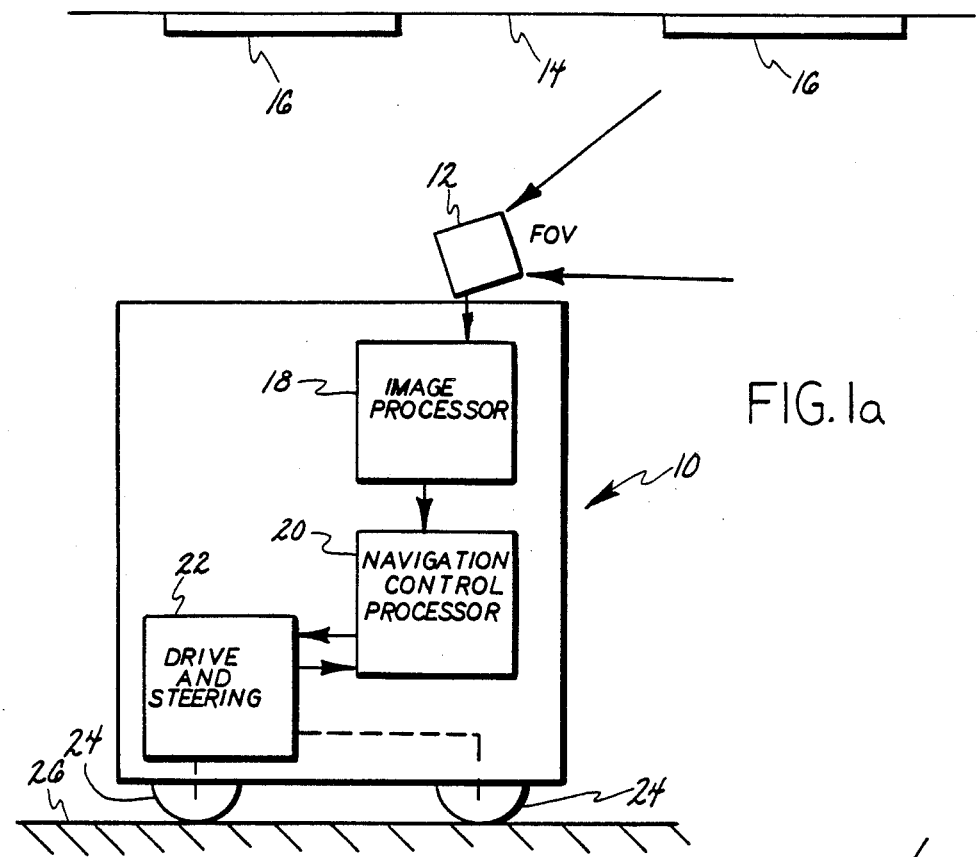
FIG. 1a is an illustrative block diagram showing a mobile robot, constructed and operated in accordance with one embodiment of the invention, which includes a camera having an upwardly pointing field of view for viewing a ceiling above the robot, the ceiling having a plurality of ceiling fixture light sources.

Referring now to FIG. 1a there is shown a side view of one embodiment of a mobile robot 10 comprising an electronic imaging device, such as a camera 12. In accordance with the invention this optical configuration is arranged to view a ceiling 14 having a plurality of light fixtures 16, the ceiling 14 being disposed above the desired path of the robot 10. The camera 12 preferably includes a CCD imaging device having a square or rectangular field of view (FOV) which is directed obliquely upward such that it images the ceiling 14 within the forward path of the robot 10. The camera 12 generates a plurality of pixels, individual ones of which have a value indicative of an intensity of radiation incident upon a corresponding surface area of the camera radiation sensing device. Robot 10 further comprises an image processor 18 which is coupled to the output of camera 12. Image processor 18, as shown in greater detail in FIG. 1b, comprises a video memory 18A which stores a representation of one video frame output of camera 12. An input to video memory 18A may be provided by an analog to digital (A/D) converter 18B which digitizes the analog output of camera 12. The digital output of A/D 18B may form an address input to a lookup table (LUT) 18C wherein pixel brightness values may be reassigned. The LUT 18C may also be employed for image thresholding and/or histogram correction. Image processor 18 further comprises an image processing device, such as a microcomputer 18D, which is coupled to the video memory 18A and which is operable for reading the stored video frame data therefrom. Image processor 18 further comprises memory 18E which includes memory for storing program instructions, constants and temporary data. The program data may be operable for performing calculations of the type which will be described in detail hereinafter. An output of image processor 18 which is expressive of position information relating to ceiling fixtures 16 within the FOV of camera 12 may be supplied, via an RS-232 or parallel data link, to a navigation control processor 20 which derives navigation data based upon the perceived image of the ceiling environment, particularly the orientation of ceiling light fixtures. This data may be employed to steer the robot down a hallway or to orient the robot within a coordinate system of a room or other enclosure having ceiling light fixtures. An output of navigation control processor 20 is supplied to a drive and steering control 22 which has outputs coupled to drive and steering wheels 24. The wheels 24 are in contact with a supporting surface 26 which is typically a floor. Navigation control processor 20 typically receives an output from the drive and steering control 22, the output being expressive of odometer readings which relate to the distance traveled by the robot 10. Navigation control processor 20 comprises a data processing device having associated memory and support circuitry. An enclosure is provided to contain the aforementioned apparatus and to provide protection therefore.

As can be seen in FIG. 1c the navigation control processor 20 is generally responsible for interpreting robot 10 position measurements generated by ceiling navigation image processor 18, in conjunction with possible inputs from other sensor systems, to control the drive system 22 in order to guide the robot 10 along a desired path. Thus, position measurements function as an error signal in a feedback control system wherein the drive and steering mechanisms serve as the actuators which change the position of the robot.

The camera 12 may be a model TM440 CCD camera manufactured by Pulnix. The camera 12 may have a relatively short focal length of, for example, 8.5 mm in order to maximize the field of view. Microcomputer 18D may be a member of the 68000 family of microprocessor devices manufactured by Motorola, Inc. LUT 18C and video memory 18A may be contained within a frame grabber pc-board such as a type manufactured by Coreco or Imaging Technologies.

Referring briefly to FIG. 3a there is illustrated a typical institutional hallway. In a suitably thresholded camera image ceiling lights 16 are the overwhelmingly prominent visual features. The linear edges, or straight line boundaries, of the ceiling lights define, in accordance with the method and apparatus of the invention, reference lines for visual navigation.

As can be appreciated, when searching for and identifying the centers and edges of ceiling lights it is important to examine as few pixels as possible in order to reduce overall processing time. This search operation is facilitated by providing for an image threshold or a camera 12 aperture setting which causes the ceiling lights to appear as bright regions which are embedded within a dark background. A binary threshold technique may then be utilized to identify bright, illuminated pixels from dark pixels.

To initially locate a ceiling light in the image an initial preliminary search may be performed over the entire image, beginning at the top row of pixels and working towards the bottom row. Once a pixel is detected that has a value above a predetermined search threshold value the preliminary search is terminated. The predetermined threshold value is influenced by such factors as the type of camera employed, the camera aperture setting and/or the particular type of pixel thresholding. The preliminary search is preferably begun from the top of the image such that a ceiling light that is nearest to the robot will first be detected.

When a pixel above the threshold is detected a method of the invention, as described below, may thereafter employ a binary subdivision search. As an example; given a white point or pixel within a ceiling light there is next located an edge of the light where a transition from white to black occurs. This may be accomplished by moving outwards from the white point while examining pixel values to detect a transition from a pixel value which corresponds to that of the light to a pixel value which corresponds to the dark background. Of course, the pixel values may not normally correspond to fully white or fully black but will typically be expressed as varying shades of gray. Sampling every pixel while moving towards an edge of the light may be less than optimum in that the edge may be hundreds of pixels removed from the initially detected pixel. Therefore, a preferred method involves stepping initially by some relatively large increment of pixels, such as by 16 pixels per step. Stepping outward in 16 pixel increments continues until a pixel value indicates that the search has entered the dark background. At this time the search increment is divided by two and the search direction is reversed. This process of dividing the stepping increment and reversing the stepping direction continues until the step size is divided down to one. At that point the pixel under consideration is either one pixel into the bright light or one pixel into the dark background. This search technique is repeated, as described below, to detect multiple edges of a ceiling light in order to obtain sufficient information to accurately locate the left and the right edges and a center point of the light.

Figure 4C:
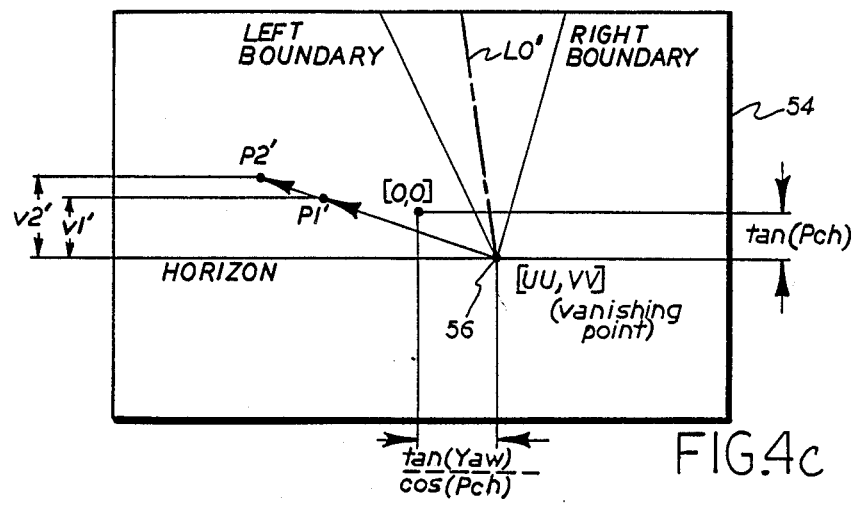
Figure 4F:
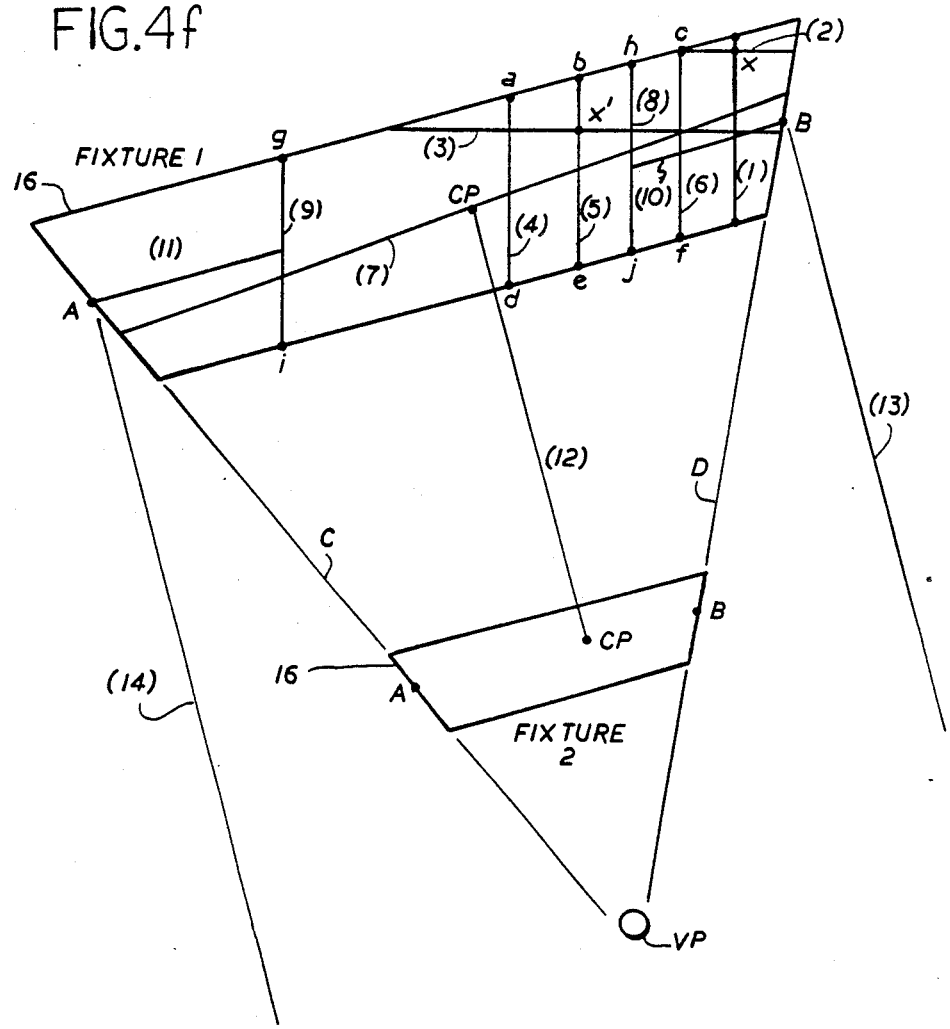

Referring to FIG. 4f it can be seen that after a pixel, designated by the point (X), within a light is found a vertical line (1) and a horizontal line (2) are projected through the point (X) to the edges of the light using the above described pixel search method. If the vertical line (1) is longer than the horizontal, a new horizontal line (3) is projected from the center of line (1). Instead, if the horizontal line (2) is longer a second vertical line is projected from the center of the horizontal line (2). These steps succeed in bringing the initial point, which may have been at an extreme edge of the light, farther into the center of the light as indicated by the point X'. Thereafter, the slope of the edges of the light is determined as described below.

A plurality of vertical lines (4, 5, and 6) are projected, one line (5) at the middle of the horizontal line (3) and the other two lines (4,6) approximately 25% in from the ends of the horizontal line (3). Thereafter, from the points (a, b, c, d, e, f) which define the ends of the vertical lines (4,5,6) there is found an average slope for the light. A line (7) is then projected which passes through the center of vertical line (5), the line (7) having a slope equal to the average slope of the light as previously calculated. It should be noted that the vertical lines (4, 5, 6) may have been drawn so close together that the calculated average slope may not be of high accuracy. Thus, the line (7) may not intersect the two ends of the light. Therefore, at points approximately 25% of the way in from the ends of line (7) two additional vertical lines (8,9) are projected and the average slope from the end points (g, h, i, j) of lines (8,9) is determined. From the center point of each of the two vertical lines (8,9) a line (10 and 11, respectively) is projected toward the nearest edge of the light along the most recently computed average slope. The edge transition between illuminated and nonilluminated pixels sensed along lines 10 and 11 indicate the true ends of the light (A,B). At a point halfway between the edges (A,B) is the center point of the light (CP).

After accurately locating one light a second light is found and analyzed in a substantially identical manner in order to generate a set of points with which to project lines (C,D) to the vanishing point at the horizon.

To find the second light a line (12) is projected downwards in the image from the center (CP) of the first light and perpendicular to the slope of line (7). Pixels along the line (12) are analyzed to determine if another light is encountered. Because of the differing angles which the lights may assume relative to one another line (12) may not intersect a second light. If this is the case two more lines (13,14) are projected from the ends of the first light perpendicularly to the line (7) to determine where and if a second light is intersected. From lines (12,13,14) it is assured that one of them will intersect another light if there is one.

It should be realized that the preceding description of a method of locating edges of ceiling lights is but one suitable technique. For example, known methods of finding straight line patterns in a video image include the use of Hough transforms, edge detection and linking, and curve fitting.

Figure 2A:
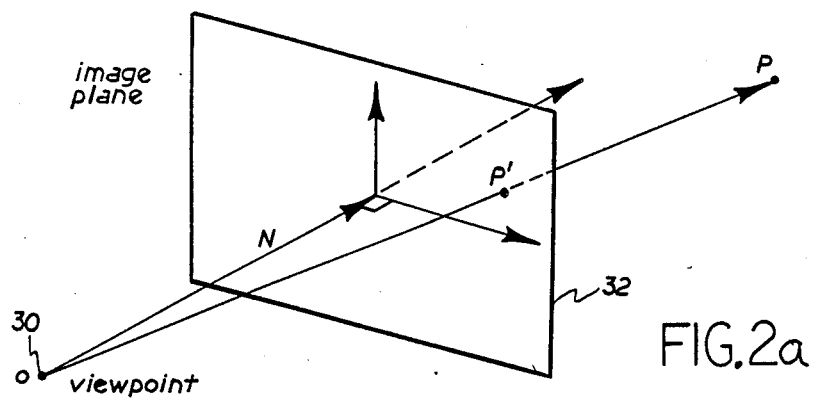
FIGS. 2a and 2b illustrate an image plane of the ceiling vision system.

Referring to FIG. 2a it is shown that the camera 12 configuration is treated geometrically as a viewpoint 30 and an image plane 32. The viewpoint 30 may be considered as the center of the camera lens. Images are projected perspectively from an arbitrary point P in three dimensional space onto point P, in the image plane 32, along a line through the viewpoint 30. It is mathematically convenient to consider the image plane 32 to be a unit distance from the viewpoint 30. N is the unit vector normal to the image plane 32. Thus units of distance measured in the image plane correspond to the tangent of the angle from the normal N through the viewpoint 30 perpendicular to the image plane 32. This convention provides for the scaling of the view angle tangent with respect to camera 12 pixel count as follows.

Figure 2B:
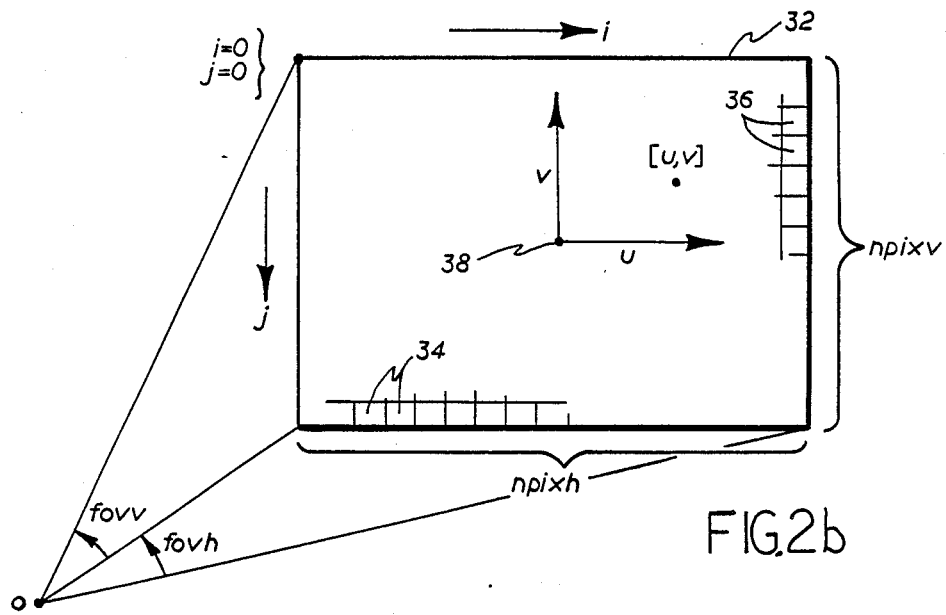

Referring to FIG. 2b it can be seen that the horizontal angle of field of view of the camera 12 is designated as fovh and the vertical angle of field of view is designated as fovv. The image plane 32 is rectangular and is positioned symmetrically with respect to the camera FOV, as is standard in most video cameras. Npixh is the number of pixels 34 in a horizontal line and npixv is the number of vertical rows of pixels 36. Image plane 32 (u,v) coordinates are given in tangent units, respectively horizontal and vertical, from the center 38 of the image plane 32. The following equations convert pixel coordinates to tangent coordinates:

$$u = (i - npixh/2)*(\tan(fovh/2)/(npixh/2)) \text{ and} \qquad (1)$$

$$v = (j - nipxh/2)*(\tan(fovh/2)/(npixv/2)); \qquad (2)$$

where i and j are the column number and row number, respectively, of a pixel from the upper left corner of the image plane 32. As used herein the symbol denotes multiplication and the symbol "/" denotes division. The pixel coordinate to tangent coordinate conversion of Equations 1 and 2 corrects the camera 12 aspect ratio and simplifies the discussion of coordinate transformations and projections which follows. The inverse equations which yield pixel number from view angle are as follows:

$$i = u*(npixh/2)/\tan(fovh/2) + npixh/2 \text{ and} \quad (3)$$

$$j = v*(npixh/2)/\tan(fovh/2) + npixv/2. \quad (4)$$

For a typical CCD video camera having an 8.5 mm focal length and a conventional frame grabber the following relationships apply:
  npixh = 512 pixels;
  npixv = 480 pixels;
  fovh = 55 degrees;
  fovv = 42 degrees.

FIG. 3a illustrates, in accordance with one aspect of the invention, a zenith gazing camera 12 mounted to the robot 10. Distance from the camera 12 viewpoint to the ceiling 14 is "c". The image plane u-axis is aligned with a vehicle forward axis. Yaw angle, theta, is measured between the u axis and a long axis, designated as A, of the hallway. The image of the ceiling as viewed by camera 12 is illustrated in FIG. 3b.

The angle of rotation of the ceiling image on the camera 12 image plane is equal to the vehicle yaw angle, as illustrated in FIGS. 3a and 3b. The precision of measurement accuracy depends in part on the accuracy of identifying a linear edge, or boundary, of a ceiling light 16 and also upon the length of the boundary. In a typical environment, the edge of a light 16 may subtend 100 pixels while the edge measurement may be accurate to within two pixels. This corresponds to approximately 0.2 radians accuracy in yaw measurement, or slightly more than one-half of a degree.

As the robot 10 moves a distance d along the floor 26, as measured by wheel encoders or odometers, the zenith projection of the view axis moves d units along the ceiling 14. Points in the image of the ceiling move distance d' in image plane u-v units. FIG. 3c illustrates this movement relative to vehicle 10 coordinates, that is, as if the vehicle 10 were stationary and the ceiling 14 moved distance d. An analysis of similar triangles yields the ceiling distance above the camera 12 viewpoint as:

$$C = d/d'. \quad (5)$$

Generally $$d' = \sqrt{u^{}2 + v^{}2}, \quad (6)$$

where "sqrt" indicates a square root function and "**" indicates exponentiation. Equation 6 reduces to $$d' = u \quad (7)$$

for camera 12 horizontal lines aligned with the direction of motion.

Considering an example in which the camera 12 is 2.5 feet above the floor 26, the ceiling 14 has a height of 10 feet and the robot 10 moves two feet per second, then c = 7.5 feet. In 250 milliseconds the robot 10 moves six inches. Therefore d' = d/c = 0.5/7.5 or 0.0666 tangent units. For a camera 12 having a FOV of 55 degrees with 512 pixels per row, this motion corresponds to 32 pixels. If c is unknown in advance, an image motion of 32 pixels within 250 milliseconds implies that the ceiling 14 is 10 feet above the floor, it being given that the camera 12 height above the floor is 2.5 feet. Thus, ceiling height may be directly inferred.

The accuracy of motion measurement is derived from pixel "footprint" size on the ceiling 14 as follows. In the example given above the fovh = 55 degrees thus one pixel represents u = tan(fovh/2)/256 = 0.002 tangent units. Hence, d = c*d' = 7.5*0.002 = 0.15 feet or 0.18 inches. While this error term may exceed that of the instantaneous motion encoder accuracy it should be realized that this error term is absolute, not cumulative, over time. Thus, if motion encoder based measurements are accurate to approximately 1%, visual observation of the ceiling 14 surpasses motion encoder based dead reckoning accuracy after only 18 inches of floor travel. However, the vehicle 10 platform may wobble somewhat due to floor surface irregularities and absorption of acceleration in the suspension of the vehicle 10 platform. A two degree tilt of the vehicle 10 projects to a three inch error on the ceiling 14, or roughly 17 pixels. If wobble of this magnitude is common, one suitable method to reduce the effect of wobble on positional registration is to use zenith gazing visual observations at intervals of three feet or more of floor travel. Kalman filtering techniques, based on covariance matrices of uncertainties, may also be employed to merge visual and encoder based position estimates thereby maintaining absolute position control.

The footprint ("headprint") of the viewscreen on the ceiling 14 for the example given above is approximately eight feet. If lights 16 are spaced more than four feet apart, and one set of lights is burned out, there will be robot positions for which no lights are visible. Using conventional CCD cameras and lenses, the FOV cannot readily be widened beyond approximately 55 degrees without inducing a "fisheye" type of distortion. This form of distortion, or aberration, distorts the linearity of images of lines, which in turn significantly complicates the geometry of image processing. A preferred solution to this limitation is to aim the camera 12 obliquely upward from the horizon, viewing an area of the ceiling ahead of the vehicle 10 and along a projected forward path of the robot.

The following description sets forth the geometry and calculations to infer vehicle orientation and lateral position in an environment, such as a hallway, from an image of ceiling lights. The following description makes use of an imaging device, such as a camera, which is pitched up obliquely at an intermediate angle between the horizon and the zenith. The ceiling lights are preferably of rectangular shape and are aligned with the hallway. The ceiling lights may be arranged with their long axis parallel to or perpendicular to a long axis of the hallway. The lights may comprise incandescent or fluorescent bulbs and may or may not be covered. Preferably the lights present a pattern or alignment which is substantially parallel to or perpendicular to the long axis of the hallway. That is, the shape being detected may be either a line boundary or a linear row of simple shapes, such as light bulbs. The inferred axis of alignment is treated as a geometric line in the following discussion.

It is convenient to center the origin at the viewpoint of the camera 12 and to adopt right-handed Cartesian coordinates (x,y,z) aligned with the hallway as follows. The z-axis is vertical, the y-axis points down the hallway parallel to the long axis of the hallway and the x-axis is perpendicular to the long axis of the hallway. Position is referenced from the camera 12 and direction is referenced with respect to the walls of the hallway. Hence the designation "cam-wall" coordinates which will be employed hereinafter.

FIG. 4a illustrates the general configuration of the cam-wall coordinate system. The distance from a camera 50 to a ceiling 52 is c. The ceiling plane is characterized as $-\infty < x < \infty$, $-\infty < y < \infty$ and $z = c$. The camera 50 is pitched up by an angle Pch radians and yawed over by an angle Yaw radians. There is no roll component in that camera raster lines are parallel to the ceiling, floor and horizon planes. Pch is measured from the x-y plane vertically to the viewplane normal vector N. Yaw is measured as the angle between the y-z plane and the vertical plane containing the vector N. From these definitions, it is apparent that the normal vector N is given by:

$$N = (x, y, z) = (\cos(Pch)\sin(Yaw), \cos(Pch)\cos(Yaw), \sin(Pch)). \quad (8)$$

That is, the vertical component of N is sin(Pch). The horizontal component is cos(Pch), which decomposes into x and y components in the ratio cos(Yaw):sin(Yaw).

Perspective projection from cam-wall coordinates to image coordinates is illustrated in FIG. 4b. A general vector P (x, y, z) in three dimensional space is connected to the origin by a straight line. It intersects the image plane 54 at $$p' = (x', y', z') = P/k = (x/k, y/k, z/k), \quad (9)$$

which defines a scaled image of P. The scale factor k is the length of the projection of P onto the screen normal N, namely, $$k = P(dot)N \quad (10)$$

by virtue of similar triangles ONP' and O(kN)P. The (dot) operation is a vector dot product given by $$k = x^*\cos(Pch)^*\sin(Yaw) + y^*\cos(Pch)^*\cos(Yaw) + z^*\sin(Pch). \quad (11)$$

Image coordinates [u,v] from the center of the image plane 54 are expressed with respect to the unit vectors U and V, namely $$[u,v] = u^*U + v^*V, \quad (12)$$

where U and V are vectors and u and v are scalars. U is a horizontal unit vector perpendicular to the x-y plane footprint of N. In cam-wall coordinates, $$U = (\cos(Yaw), \sin(Yaw), 0). \quad (13)$$

V is a unit vector perpendicular at both N and U, that is, the vector cross product of N and U which is given by $$V = U \times N = \quad (14)$$

$$det \begin{bmatrix} I & J & K \\ \cos(Yaw) & \sin(Yaw) & 0 \\ -\cos(Pch)^*\sin(Yaw) & \cos(Pch)^*\cos(Yaw) & \sin(Pch) \end{bmatrix},$$

where I, J, K are the unit basis vectors of the (x, y, z) cam-wall coordinates.

That is, $$V = (\sin(Pch)^*\sin(Yaw), -\sin(Pch)^*\cos(Yaw), \cos(Pch)). \quad (15)$$

The image plane 54 coordinates of the image of a point P are the projections of P' onto U and V, namely, $$u = p'(dot)U \quad (16)$$

$$v = p'(dot)V \quad (17)$$

which expands to $$u = (x/k)^*\cos(Yaw) + (y/k)^*\sin(Yaw), \text{ and} \quad (18)$$

$$v = (x/k)^*\sin(Pch)^*\sin(Yaw) - (y/k)^*\sin(Pch)^*\cos(Yaw) + (z/k)^*\cos(Pch). \quad (19)$$

A row of ceiling lights along the axis of the hallway defines a line, LO, which is parallel to both the walls and the floor. In cam-wall coordinates, the equation of line LO is $$x = xO, y = s, z = zO \quad (20)$$

where s is a line LO length parameter, Which may range from plus to minus infinity. Values xO and zO are the lateral and vertical distances of the line from the viewpoint. The projection of this line onto the image plane 54 is $$u = (xO/k)^*\cos(Yaw) + (s/k)^*\sin(Yaw), \text{ and} \quad (21)$$

$$v = (xo/k)^*\sin(Pch)^*\sin(Yaw) - (s/k^*\sin(Pch)^*\cos(Yaw) + (zo/k)^*\cos(Pch) \quad (22)$$

where $$k = xO^*\cos(Pch)^*\sin(Yaw) + s^*\cos(Pch)^*\cos(Yaw) + zO^*\sin(Pch). \quad (23)$$

As s goes to infinity, u and v approach the limits $[u,v] \to [uu,vv]$, where $$uu = \sin(Yaw)/(\cos(Yaw)^*\cos(Pch)) \quad (24)$$
$$= \tan(Yaw)/\cos(Pch), \text{ and}$$

$$vv = -\tan(Pch). \quad (25)$$

As seen in FIG. 4c the projected the image LO' of the ceiling line LO approaches a vanishing point 56 on the screen. This vanishing point 56 is the intersection of the images of all lines parallel to LO, i.e. with all possible choices of xO and zO. Intuitively, it is a point on a horizon where two parallel lines, such as railroad tracks, would appear to converge and meet.

This converging line analogy is advantageously employed, in accordance with a method of the invention, to determine the values of uu and vv. That is, two lines within the image plane 54 are selected which are images of ceiling features known to be in a parallel relationship, such as the left and right boundary of a row of ceiling lights 16 as in FIG. 3a. The intersection in image plane coordinates of the two boundaries is then determined by the substitution of the equation of one boundary into the other. The determined intersection point may lie physically off the image plane 54 but nevertheless yields values for the vanishing point uu and vv. Pitch is thus $$\text{Pch} = -\arctan(vv) \tag{26}$$

and yaw is $$\text{Yaw} = \arctan(uu^*\cos(\text{Pch})). \tag{27}$$

It should be noted that vv is independent of Yaw. The value of v is therefore the horizontal line on the screen that is the image of the horizon.

Returning briefly now to a consideration of FIG. 4a it should be recalled that once camera pitch (Pch) is known, ceiling height may be inferred from the motion of image features as the vehicle 10 moves along the floor. To further clarify the relevant geometry, it is useful to consider a coordinate system which aligns with the forward direction of the camera and vehicle motion. This is accomplished by rotating the x-y plane of the cam-wall coordinate system such that it aligns with the horizontal component of the image plane 54 normal N. FIG. 4d illustrates this new coordinate system. Note that the z-axis is in common with the cam-wall coordinates while the x-axis the y-axis are replaced by a u-axis and a w-axis whose basis vectors are $$U = \cos(^*Yaw), \sin(Yaw), \quad 0) = \{1, 0, O\}, \tag{28}$$

$$W = -\sin(Yaw), \cos(Yaw), \quad 0) = \{0, 1, O\}, \tag{29}$$

and $$Z = \{0, 0, 1\}. \tag{30}$$

The brace notation $\{u, w, z\}$ denotes coordinates with respect to the basis U, W, Z which will be referred to herein as the "cam-floor" coordinates system. Both the cam-wall and cam-floor coordinate systems use the camera viewpoint as the origin 50. Conversion from (x,y,z) to $\{u,w,z\}$ is accomplished by the transformation:

$$\{u, w, z\} = (x, y, z) \begin{bmatrix} \cos(Yaw) & -\sin(Yaw) & 0 \\ \sin(Yaw) & \cos(Yaw) & 0 \\ 0 & 0 & 1 \end{bmatrix} = \tag{31}$$

$$\{x^*\cos(Yaw) + y^*\sin(Yaw), -x^*\sin(Yaw + y^*\cos(Yaw), z\}.$$

The inverse transformation is accomplished by $$(x, y, z) = \{u, w, z\} \begin{bmatrix} \cos(Yaw) & \sin(Yaw) & 0 \\ -\sin(Yaw) & \cos(Yaw) & 0 \\ 0 & 0 & 1 \end{bmatrix} = \tag{32}$$

$$(u^*\cos(Yaw) - w^*\sin(Yaw), u^*\sin(Yaw) + w^*\cos(Yaw), z).$$

Referring to FIGS. 4b, 4c and 4e and considering the trajectory of a point P on the ceiling in cam-floor coordinates as the robot moves forward, u = uO, w = s and z = zO, where s is the parameter of distance travelled in direction W. The image of this line is derived by projection onto the image plane 54 as follows. The image plane U basis vector is the same as for cam-wall coordinates, as previously set forth in Equation 28.

The image plane 54 normal in cam-floor coordinates is given by $$N = \{O, \cos(\text{Pch}), \sin(\text{Pch})\} \tag{33}$$

and the image plane 54 basis vector (V) is $$V = \{O, -\sin(\text{Pch}), \cos)\text{Pch}\}. \tag{34}$$

Thus P projects onto the screen at $$p' = P/k = \{uO/k, s/k, zO/k\} \tag{35}$$

where $$k = P(\text{dot})N = s^*\cos(\text{Pch}) + zO^* \sin(\text{Pch}), \tag{36}$$

Image plane 54 coordinates are derived by projecting p' onto U and V, $$\begin{aligned} u &= P(\text{dot})U = uO/k, \text{ and} \\ v &= P(\text{dot})V = -s^*\sin(Pch)/k + zO^*\cos(Pch)/k. \end{aligned} \tag{37}$$

These image lines, which represent the streamlines of optic flow, all radiate from the vanishing point, $$[uu, vv] = [O, -\tan(\text{Pch})]. \tag{38}$$

Transforming the origin of image plane coordinates to this point, using the primed bracket to denote the new image plane coordinate system, $$[u', v'] = [u-uu, v-vv] \tag{39}$$

implies that an arbitrary optic flow line maps into $$\begin{aligned} {[u', v']} &= uO/k, zO/(s = zO^*\tan(Pch))]', \text{ or} \\ {[u', v']} &= -[uO/k, zO/(k^*\cos(Pch))]', \end{aligned} \tag{40}$$

Thus, the slope of the optic flow line is $$v'/u' = zO/(uO^* \cos(\text{Pch})). \tag{41}$$

It is noted that the v' component is independent of uO which simplifies the computation of ceiling height as will be shown.

FIG. 4e illustrates the w-z component of image plane and ceiling. The u-component can be ignored in computing zO as previously shown. As the vehicle 10 moves forward distance d in the direction W, the footprint ("headprint") of the screen moves distance d along the ceiling. Any point P1 moves distance d to P2; the corresponding images on the screen are P1' and P2', separated vertically by d' in the image plane. That is, v2'−v1'=d'.

As can be seen d' and d" are a side and a base, respectively, of a triangle similar to the one formed by the image plane 54 w-axis and the line 0-P2'. Thus, $$\begin{aligned} d''/d' &= (1/\cos(Pch))/v2', \text{ or} \\ d'' &= d'/(v2'^*\cos(Pch)) = (v2' - v1')/v2'^*\cos(Pch)). \end{aligned} \tag{42}$$

Inasmuch as d" and d are corresponding parts of similar triangles 0-P1'-Q and 0-P1-P2 whose altitudes, indicated by the vertical dashed lines in FIG. 4e, are v1'*cos (Pch) and zOit can be realized that $$zO/d = v1'^*\cos(\text{Pch})/d'', \text{ and} \tag{43}$$

$$zO = C = d^*v1'v2'^*\cos^2(\text{Pch})/((v2'-v1'). \tag{44}$$

Equation 44 gives ceiling elevation as a function of image plane 54 pitch and the image plane 54 vertical coordinates, [v1', v2',], of two successive images of a feature, the vehicle traveling a distance d between images. The ratio of d" to d is the same as the ratio of the w-component of ranges from the origin to P1' and P1, respectively, by virtue of similar triangles 0-P2'-R and 0-P1-S. Thus, $$w1/d = (1/(\cos(Pch) - v2'*\sin(Pch))/d'' \quad (45)$$

which implies $$(w1 = d*v2'*(1 - v1'*\sin(Pch)*\cos(Pch))/(v2' - v1'). \quad (46)$$

Thus, the invention provides for range to be inferred from the same image data that yields ceiling height. Lateral displacement of the robot 10 from the tracked ceiling feature is derived below.

Recalling from Equation 41 that the slope of the image line is $v'/u' = zO/(uO*\cos(Pch))$ the lateral position of the tracked feature relative to the robot path (u-axis coordinate) is $$uO = (u1'/v1')*zO/\cos(Pch), \text{ and} \quad (47)$$

$$uO = (u2'/v2')*zO/\cos(Pch). \quad (48)$$

If ceiling height is known, either from a database, sonar readings, or from the optic flow analysis as described above, the position of the robot 10 with respect to the center line LO, or any other measurable line, of the ceiling may be derived in hallway coordinates as described below. Robot pitch and yaw are also necessary inputs. As shown in the preceding discussion, pitch and yaw may be derived from the image plane 54 coordinates of the vanishing point 56.

The cam-wall origin and the line LO described previously define a plane known as an epipolar plane.

Figure 6:
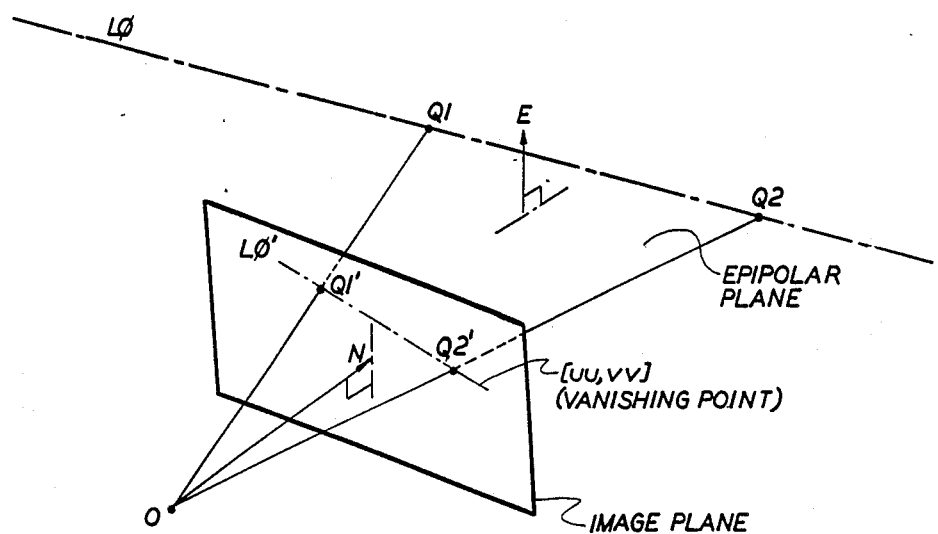
FIG. 6 illustrates an epipolar plane of a ceiling line LO, the epipolar plane being defined by an origin, O, and the points Q1 and Q2.

FIG. 6 illustrates the configuration. Q1 and Q2 are two arbitrary points on the line LO. The origin O, Q1 and Q2 define the epipolar plane of the ceiling line LO. The intersection of the epipolar plane with the image plane 54 yields an epipolar line, which is the locus of screen images of all possible points on LO. That is, the projections of points Q1 and Q2 onto Q1' and Q2' in the image plane define a line LO' in the image plane. The choice of points Q1 and Q2 is arbitrary; image line LO' is a unique projection of ceiling line LO onto the screen. Since Q1' and Q2' lie in the epipolar plane and in the image plane, epipolar line LO' lies in both planes; thus its direction is perpendicular to both the normal of the image plane and the normal of the epipolar plane. A normal, in cam-wall coordinates, to the epipolar plane is given by $$E = (-zO, 0, Xo). \quad (49)$$

The epipolar line direction is thus given by the cross product $$E \times N = (xO*\cos(Yaw)*\cos(Pch), \quad (50)$$
$$xO*\cos(Pch)*\sin(Yaw) + zO*\sin(Pch),$$
$$-zO*\cos(Pch)*\cos(Yaw))$$

To convert to image plane coordinates, this vector is projected onto the unit basis vectors of the image plane, or $Eu = (E \times N)(dot)U$ and $Ev = (E \times N)(dot)V$ which yields $$Eu = XO*\cos(Pch) + zO*\sin(Pch)*\sin(Yaw), \text{ and} \quad (51)$$

$$Ev = -zO*\cos(Yaw). \quad (52)$$

The slope of the epipolar line LO'(FIG. 4c) in the u-v plane is thus $$Ev/Eu = -zO*\cos(Yaw)/xO*\cos(Pch) + zO*\sin(Pch)*\sin(Yaw). \quad (53)$$

Therefore, lateral displacement (xO) of the camera origin from ceiling line LO can be derived from pitch, yaw, ceiling height (zO) and, slope (m) of the image LO' of LO on the image plane 54 (FIG. 4c and FIG. 6)

$$xO = -zO*\cos(Yaw)/(m*\cos(Pch)) \quad (54)$$
$$-zO*\sin(Pch)*\sin(Yaw)/\cos(Pch).$$

EXAMPLE

The following example illustrates a sequence of operations for inferring orientation and lateral position relative to a line of lights along a ceiling as viewed through an obliquely aimed camera.

Recalling from the discussion of FIG. 3a that in an appropriately thresholded image of the ceiling the ceiling lights 16 stand out as major visual features. The two solid lines in FIG. 4c indicate the left and right boundaries of the lights 16. These lines converge at a vanishing point [ii, jj] in pixel coordinates. Pixel coordinates are converted to tangent units [uu, vv] using Equations 1 and 2. Pitch angle (Pch) is given by Equation 26 and the yaw angle by Equation 27.

Ceiling height (c) above the camera may be measured by measuring optic flow against forward travel, yielding a value for c as described in Equation 44. Using the value of c so obtained, or a sonar measurement of ceiling height, lateral displacement from the center line can be measured using the preceding derived values as given in Equation 54.

Alternatively, exact position with respect to an arbitrary ceiling feature may be derived together with the ceiling height measurement as, $$c = d*v1'*v2'*\cos(Pch)/(v2' - v1'), \quad (55)$$

$$u = (u2'/v2')*c/\cos(Pch) \quad (56)$$

$$w = d*v2'*(1 - v1'*\sin(Pch)*\cos(Pch))/(v2' - v1'). \quad (57)$$

Figure 1B:
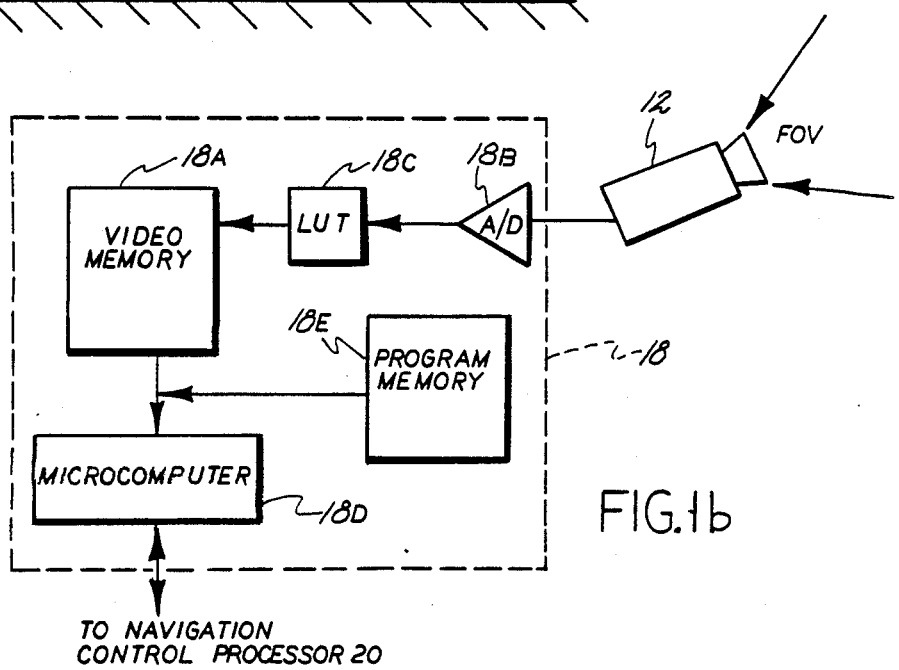

Equations 55-57 may be readily solved with, for example, the data processor 18D of FIG. 1b. Four image data points per frame are sufficient to determine the vanishing point P. The computation is a 2-by-2 matrix inversion, applied once to solve the intersection of the lines. Next, pitch and yaw are computed. Generally, pitch remains fixed during movement down a hallway. Also, ceiling height typically needs to be computed but once on entering a hallway. Alternatively, ceiling height may be derived from a sonar measurement or be an element of a stored database related to a map of the robots, anticipated path or environment, thereby eliminating the need for a computation of c. Regardless of the source of the data, ceiling height will generally remain fixed for sufficiently long distances along the path of the robot such that it imposes insignificant computational burdens. Inference of lateral drift of the robot generally requires eight multiply/divides and one add, on a per frame basis, not per pixel.

It should be realized that the teaching of the invention applies to vehicle environments other than a hallway. For example, in FIG. 5 there is shown a top view of a robot 10 within an environment having a plurality of banks of ceiling light fixtures 16. The environment may be a typical room within an office building or may be, by example, a large enclosure such as a gymnasium. An image of the two banks of lights are processed to derive two ceiling lines which intersect at a point P. Ceiling line 1 runs parallel to a long edge of one bank of lights while ceiling line 2 runs parallel to a short edge of two banks of lights. The (x,y) floor position of robot 10 may be inferred as the amount of offset from each of the ceiling lines. The angle Theta, or angular orientation to ceiling line 1 or 2 may also be readily derived.

The foregoing description of the invention has been presented in the context of a vehicle such as mobile robot which navigates through an environment having an overlying planar surface, such as a ceiling, and sources of illumination, such as ceiling light fixtures, disposed thereon. It should be appreciated that the teaching of the invention is applicable to a number of applications and environments other than those disclosed above. In that those having skill in the art may derive modifications to what has been taught above it is intended that the invention not be limited to only the above described embodiments but, instead, that the invention be limited only as set forth in the claims which follow.

What is claimed is:

1. Navigation apparatus for generating navigation related information for a vehicle, comprising:
    means for obtaining a two-dimensional image of a surface which overlies a vehicle or a projected path of the vehicle, the two-dimensional image being comprised of a plurality of image pixels, the surface being a horizontal surface disposed parallel to a plane upon which the vehicle moves, the surface having one or more sources of illumination disposed upon or within the surface;
    means, coupled to said obtaining means, for detecting a location within the image of the one or more sources, said detecting means comprising means for processing the two-dimensional image to detect pixels having a brightness value that exceeds a threshold brightness value, the detected pixels including pixels associated with an image of an edge of the one or more sources of illumination; and
    means, coupled to said detecting means for generating, from the detected source location or locations, at least vehicle orientation information relative to the edge of the one or more sources of illumination.

2. Navigation apparatus as set forth in claim 1 wherein said generating means comprises:
    means for determining an offset distance and an angular displacement of the vehicle relative to the location of the source within the image.

3. Navigation apparatus as set forth in claim 1 wherein said generating means further comprises means for determining a vertical distance from the vehicle to the surface and means for determining vehicle position as a function of the location in the image of the edge of the one or more sources of illumination and as a function of the determined vertical distance.

4. Navigation apparatus as set forth in claim 1 wherein said two-dimensional image obtaining means is comprised of a CCD camera means.

5. Navigation apparatus as set forth in claim 1 wherein said two-dimensional image obtaining means is comprised of a vidicon camera means.

6. Navigation apparatus as set forth in claim 1 wherein said processing means further comprises means for identifying pixels which correspond to an image of two substantially parallel edges of the source.

7. Navigation apparatus as set forth in claim 7, wherein said generating means comprises means, coupled to said processing means, for projecting within the image a line from the pixels which correspond to each of the substantially parallel edges of the source, the intersection of the projected lines locating a position of a horizon line within the two-dimensional image.

8. Navigation apparatus as set forth in claim 1 wherein said generating means further comprises means for identifying a pixel or pixels corresponding to a center of the source and further comprises means for projecting a line within the image from the pixel or pixels corresponding to the center of the source such that the projected line intersects a determined horizon line within the image.

9. Navigation apparatus as set forth in claim 8 wherein said generating means further comprises:
    means for determining a vehicle offset distance and an angular displacement of line projected from the pixels corresponding to the center of the source.

10. Navigation apparatus for generating navigation related information for a mobile robot, comprising:
    means for imaging at least a portion of a ceiling disposed over a forward path of a mobile robot, said imaging means generating a two-dimensional image comprised of a plurality of image pixels;
    means for locating, within the imaged portion of the ceiling, at least one edge of at least one ceiling light which is disposed within the imaged portion of the ceiling, the at least one ceiling light providing illumination, said locating means comprising means having an input coupled to the imaging means for processing the two-dimensional image to detect pixels having a brightness value that exceeds a threshold brightness value, the detected pixels including those pixels associated with the image of the ceiling light; and
    means for generating a reference axis of robot motion relative to the located boundary of the ceiling light; and
    means for determining at least an orientation angle of the robot relative to the reference axis of robot motion.

11. Navigation apparatus as set forth in claim 10 wherein said image forming means is comprised of a CCD camera means.

12. Navigation apparatus as set forth in claim 10 wherein said image forming means is comprised of a vidicon camera means.

13. Navigation apparatus as set forth in claim 10 and further comprising means for measuring a height of the ceiling relative to the robot.

14. Navigation apparatus as set forth in claim 10 and further comprising means, coupled to said determining means, for controlling a motion of the robot relative to the reference axis of robot motion.

15. Navigation apparatus as set forth is claim 10 and further comprising means for determining a height of the ceiling relative to the robot, said height determining means being coupled to an input of said measuring means for determining the height based upon at least two images of the ceiling obtained at two different positions whose separation is known by odometry.

16. Navigation apparatus as set forth in claim 10 and further comprising
- means for projecting a line from the pixels corresponding to the located boundary of the ceiling light; and
- means for determining a robot positional offset distance and an angular displacement of a direction of robot forward motion relative to the line projected from the pixels corresponding to the boundary of the ceiling light.

17. A method of providing navigation related information for a mobile robot, comprising the steps of:
- obtaining at least one two-dimensional image of a ceiling having one or more visual illuminated ceiling lights, the ceiling overlying at least the projected path of the robot, the two-dimensional image being comprised of a plurality of image pixels;
- locating within the ceiling image the one or more illuminated ceiling lights, the step of location including a step of examining pixels from the two-dimensional image to detect pixels having a value that exceeds a threshold value, the threshold value being selected to differentiate between a pixel associated with the illuminated ceiling light and a pixel not associated with the illuminated ceiling light;
- detecting a boundary of at least one of the illuminated ceiling lights;
- generating at least one reference line relative to the detected boundary; and
- determining at least an angular orientation of the robot relative to the reference line.

18. The method of claim 17 wherein the step of obtaining an image includes a step of generating a two-dimensional image frame comprised of image pixels each of which has a value which is a function of at least the brightness of a corresponding portion of the ceiling.

19. The method of claim 17 wherein the step of generating at least one reference line includes a step of projecting perspective lines along detected boundaries such that the projected lines intersect a horizon line associated with the image.

20. The method of claim 17 wherein the step of determining a position includes a step of determining an offset distance from the robot to the reference line.

21. A method of providing navigation information for a vehicle, comprising the steps of:
- imaging with a two-dimensional image generating means a surface which is disposed above at least the projected forward path of the vehicle, the surface having a height zo above the vehicle, the surface including one or more sources of illumination;
- detecting within a generated two-dimensional image of the surface at least two opposing edges of one of the sources of illumination, the step of detecting including a step of examining image pixels from the two-dimensional image to detect those pixels having a value that exceeds a threshold value, the threshold value being selected to differentiate between a pixel associated with a source of illumination and a pixel not associated with a source of illumination;
- detecting at least two opposing edges of a second one of the sources of illumination;
- determining a centrally located point of each of the sources of illumination, a line passing through each of the centrally located points defining an axis of alignment, the axis of alignment intersecting a horizon line associated with the two-dimensional image;
- projecting the axis of alignment unto the two-dimensional image to obtain a slope m;
- determining a pitch (Pch) component and a yaw (Yaw) component of vehicle orientation relative to the axis of alignment; and
- determining a lateral displacement xO of the vehicle from the axis of alignment in accordance with the equation:

$$xO = -zO^*\cos(Yaw)/(m^*\cos(Pch))$$
$$-zO^*\sin(Pch)^*\sin(Yaw)/\cos(Pch).$$

22. A method as set forth in claim 21 wherein a vertical position of the horizon line within the two-dimensional image is a function of a position of a vanishing point within the two-dimensional image, the position of the vanishing point being defined by image coordinates uu and vv and wherein the pitch component is determined in accordance with the equation $$Pch = -\arctan(vv)$$

and wherein the yaw component is determined in accordance with the equation $$Yaw = \arctan(uu^*\cos(Pch)),$$

23. A method as set forth in claim 21 and including a step of determining the height (zo) of the surface above the vehicle as a function of (Pch) and vertical coordinates measured relative to the horizon line as obtained from two successive images of the surface.

24. A method as set forth in claim 21 and including a step of determining the height (zo) of the surface above the vehicle by making a sonar determination.

* * * * *

UNITED STATES PATENT AND TRADEMARK OFFICE
CERTIFICATE OF CORRECTION

PATENT NO. : 4,933,864

DATED : June 12, 1990

INVENTOR(S) : Evans, Jr. et al.

It is certified that error appears in the above-identified patent and that said Letters Patent is hereby corrected as shown below:

Claim 7, Col. 16, line 11 delete "claim 7" and insert --claim 6--.

Claim 9, Col. 16, line 29 after "of" insert --vehicle orientation relative at least to the--.

Claim 15, Col. 17, line 2 delete "input" and insert --output--.

Claim 17, Col. 17, line 19 delete "visual".

Claim 17, Col. 17, line 25 delete "location" and insert --locating--.

Claim 21, Col. 18, line 1 delete "zo" and insert --zO--.

Claim 22, Col. 18, last line delete "," and insert --.--.

Signed and Sealed this

Ninth Day of July, 1991

Attest:

HARRY F. MANBECK, JR.

*Attesting Officer*    *Commissioner of Patents and Trademarks*